United States Patent
Ronström

(10) Patent No.: US 6,466,936 B1
(45) Date of Patent: Oct. 15, 2002

(54) METHOD FOR LOAD REGULATION

(75) Inventor: Ulf Mikael Ronström, Hägersten (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/444,714

(22) Filed: Nov. 24, 1999

(30) Foreign Application Priority Data

Nov. 26, 1998 (SE) ................................. 9804076

(51) Int. Cl.[7] ........................... G06F 17/30; G06F 7/00
(52) U.S. Cl. .................................................... 707/10
(58) Field of Search .................... 707/1–10, 100–104.1, 707/200–226, 500–542; 709/345, 316, 319, 1, 100–106, 200–202, 203–253

(56) References Cited

U.S. PATENT DOCUMENTS

| | | | | |
|---|---|---|---|---|
| 5,031,089 A | * | 7/1991 | Liu et al. | 709/201 |
| 5,379,424 A | | 1/1995 | Morimoto et al. | 395/600 |
| 5,450,584 A | | 9/1995 | Sekiguchi et al. | 395/650 |
| 5,551,027 A | | 8/1996 | Choy et al. | 395/600 |
| 5,606,693 A | | 2/1997 | Nilsen et al. | 395/610 |
| 5,655,120 A | | 8/1997 | Witte et al. | 395/675 |
| 5,668,986 A | | 9/1997 | Nilsen et al. | 395/610 |
| 5,701,482 A | | 12/1997 | Harrison et al. | 395/675 |
| 5,774,731 A | * | 6/1998 | Higuchi et al. | 710/200 |
| 6,067,545 A | * | 5/2000 | Wolff | 370/238 |
| 6,101,508 A | * | 8/2000 | Wolff | 707/1 |
| 6,256,621 B1 | * | 7/2001 | Tsuchida et al. | 707/10 |
| 6,330,604 B1 | * | 12/2001 | Higuchi et al. | 709/226 |

FOREIGN PATENT DOCUMENTS

| | | | |
|---|---|---|---|
| EP | 0642092 A2 | 3/1995 | G06F/17/30 |
| EP | 0822494 A2 | 2/1998 | G06F/9/46 |

* cited by examiner

Primary Examiner—John Breene
Assistant Examiner—Linh M Pham
(74) Attorney, Agent, or Firm—Burns, Doane, Swecker & Mathis, L.L.P.

(57) ABSTRACT

The present invention relates to a method of regulating the load in a distributed database (A), where the information within the database is distributed between several different nodes (1, 2, 3, . . . , k) belonging to the database. A request (4a) from a user (4) is served either by the node to which the user connects, here designated the receiving node (1), or by some other node after the receiving node (1) has forwarded the request to a node that can meet the request, this node being called the serving node (2). Respective nodes are given one or several key-numbers which limit the number of requests that respective nodes may accept in their role as a receiving node (1). The key-numbers are related to the executing capacity of the database (A).

16 Claims, 6 Drawing Sheets

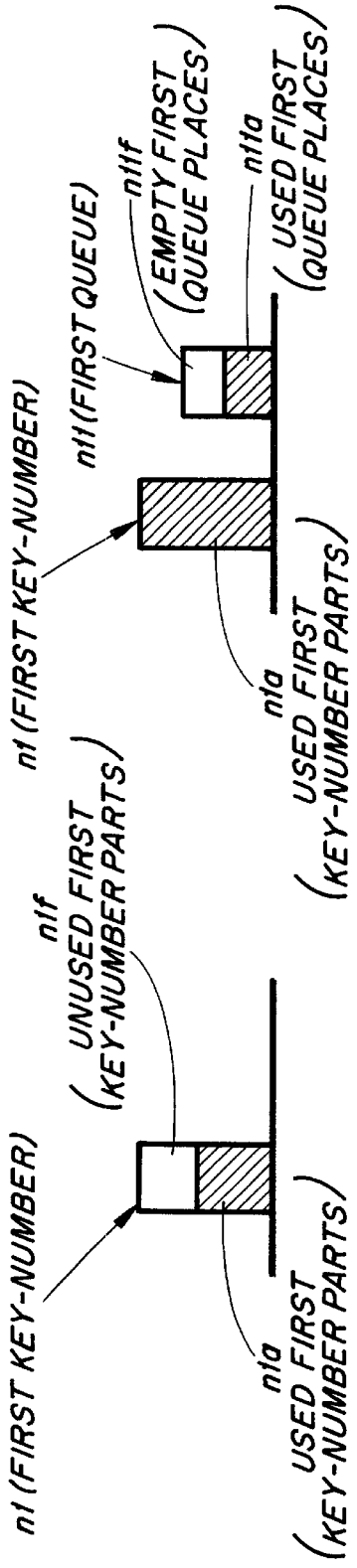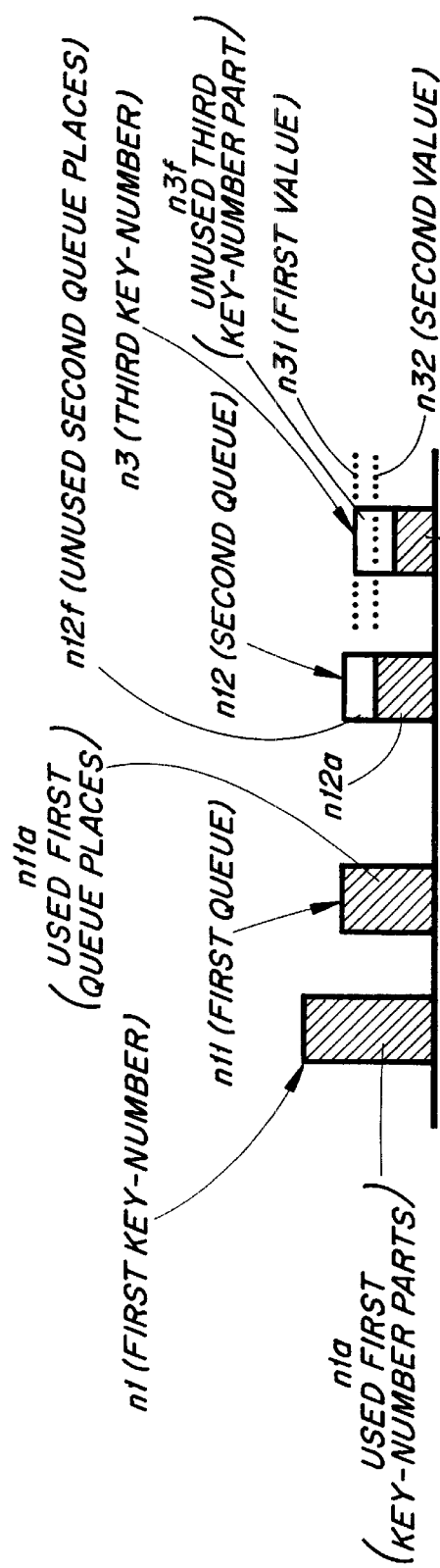

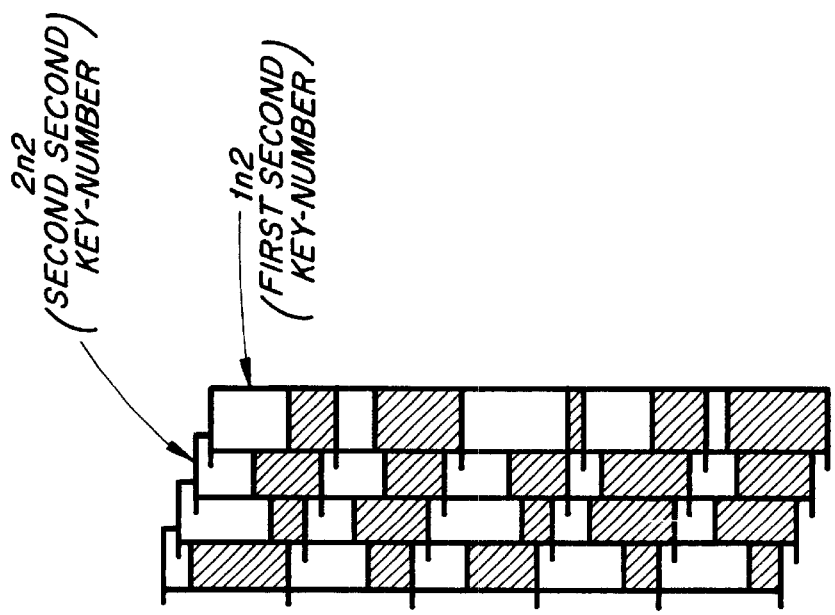
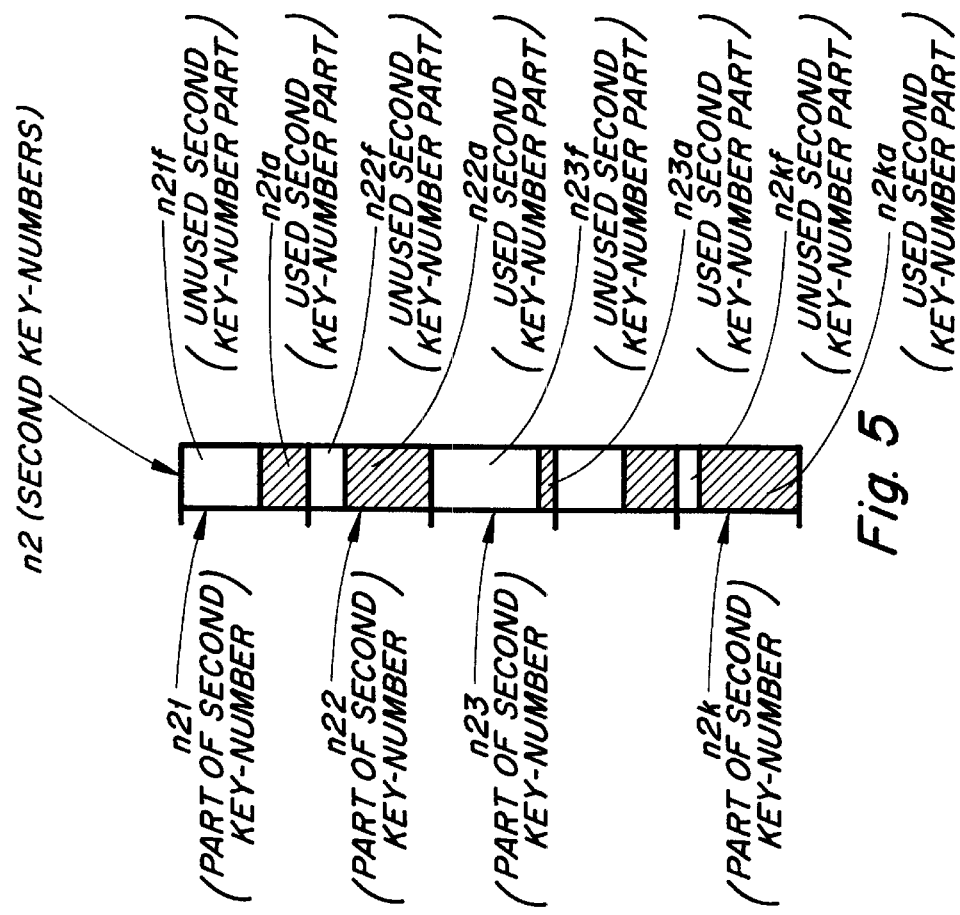

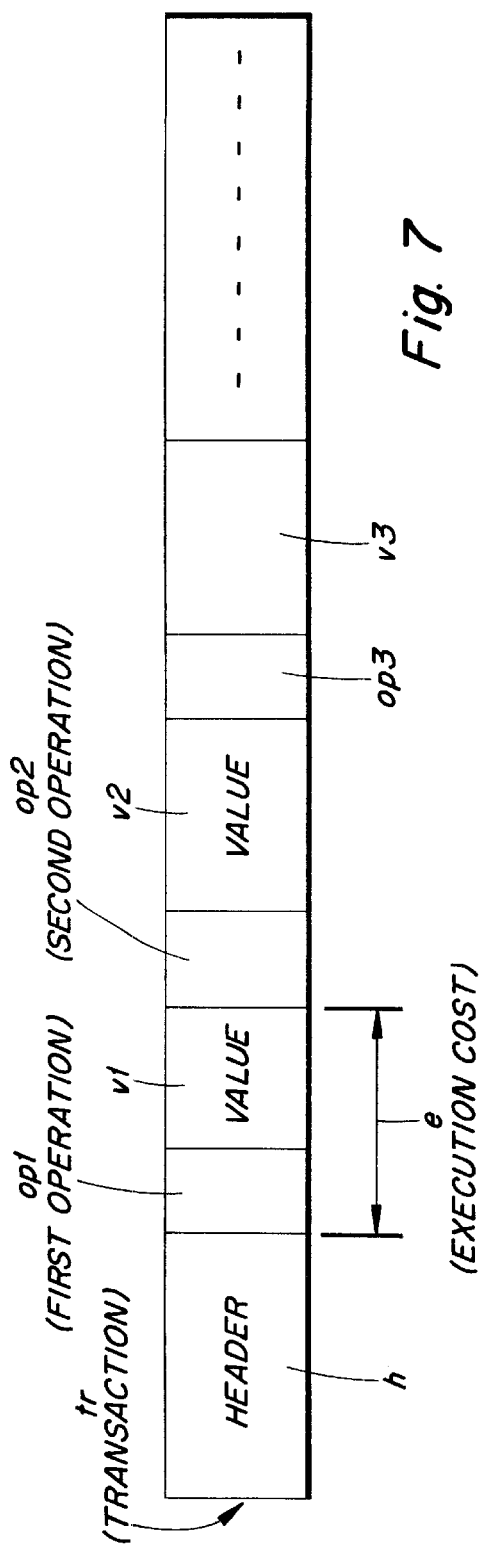

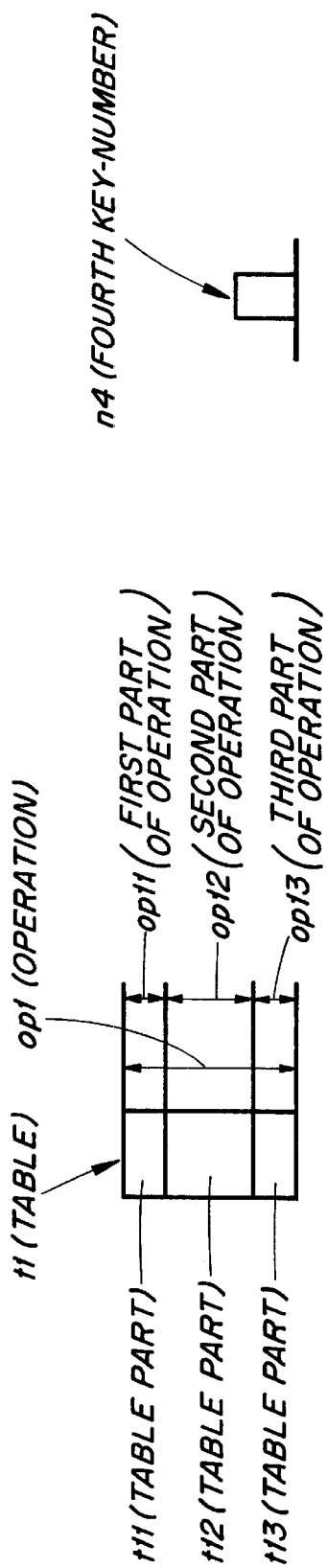
Fig. 10
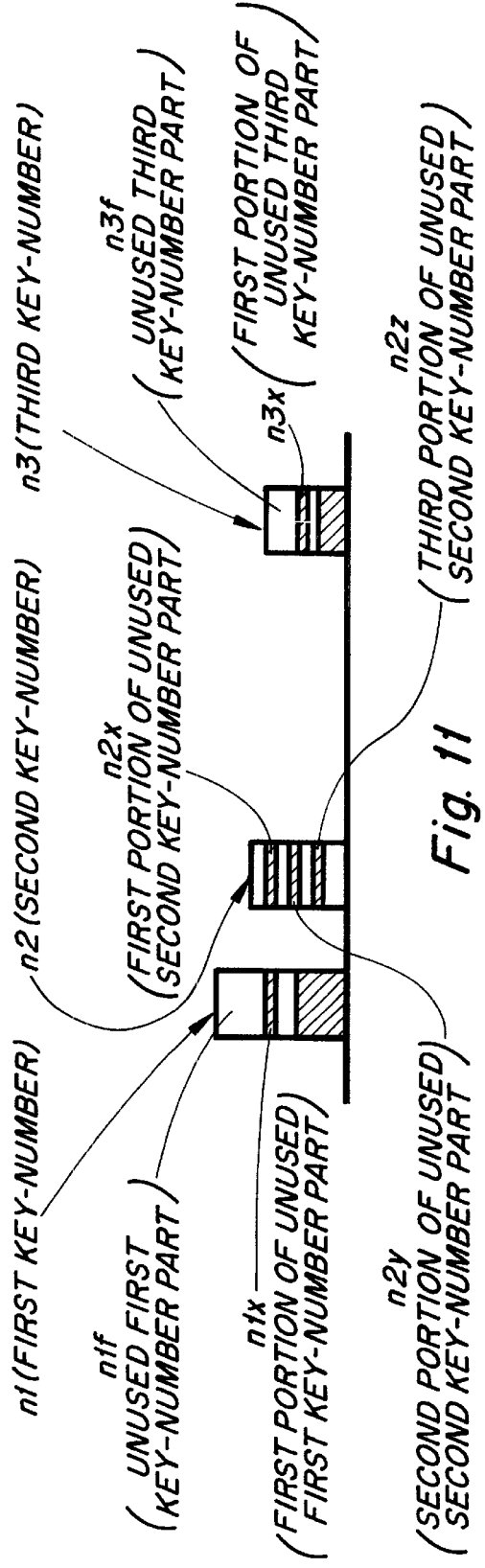
Fig. 11
Fig. 12

METHOD FOR LOAD REGULATION

This application claims priority under 35 U.S.C. §§119 and/or 365 to 9804076-9 filed in Sweden on Nov. 26, 1998; the entire content of which is hereby incorporated by reference.

1. Field of Invention

The present invention relates to a method of regulating load in a distributed database.

In a distributed database, information entering the database is distributed between several different database nodes. A request from a user is served either by the node to which the user connects, which is here called a receiving node, or by another of said nodes that is able to meet the request, after the receiving node having forwarded the request to said other node. A node that can meet the request is here called the serving node.

2. Description of the Background Art

It has long been known that in the case of a distributed database in which information or data belonging to the database is distributed between several different nodes a user need not necessarily know in which node the requested information is found, but simply connects to a node and asks to be allowed to perform an operation in the database.

This operation may be one in which the user requires access to information in the database, or access to one or more objects therein, for instance to read the object or to write into the object.

The receiving node may itself be a serving node that can meet the request, or forwards the request to the node in the database that can deal with the request, in other words the node that includes the requested object.

It should be mentioned that there is a difference between an operation and a transaction. A transaction includes a plurality of operations, where the number of operations concerned will depend on the complexity of the transaction.

It is also known that the total executing capacity of a database is equal to the sum of the executing capacities of all the nodes in the database. When requests are made to the various nodes and these requests need to be distributed between said nodes, hot spots are liable to occur which overload one node whilst leaving other nodes spare capacity, despite the fact that the total capacity of the database has not been used to the full.

Several different methods of solving this problem are known to the art, these methods normally being referred to as load regulating methods.

Prior Publication U.S. Pat. No. 5,450,584 teaches a load regulating method where an internal load monitoring unit in each node monitors the extent to which the own node is loaded, and an external load monitoring unit in each node that monitors the extent to which each other node is loaded. A central unit for handling the load distribution within the database is connected to each unit for load monitoring purposes.

The central load distributing unit functions to shift information from a node which, via its internal load monitoring unit, indicates that the internal node has exceeded a highest permitted level, to a selected other node in the database. This movement of information, often requested information, from a heavily loaded node to a less loaded node results in more uniform distribution of the load between the nodes in the database.

Prior Publication EP-A2-0 642 092 teaches a method of regulating the load within a parallel database system. Load distribution is governed by the way the information in the database can be redistributed from an active node to a new node or to an unused node.

This method is thus also based on the redistribution of information in the database between the nodes included therein.

Prior Publications U.S. Pat. Nos. 5,551,027, 5,379,424, 5,668,986 and 5,606,693 describe further methods for regulating the load in distributed databases or distributed information within a computer system.

SUMMARY OF THE PRESENT INVENTION

Technical Problems

When considering the present state of the art as described above, it will be seen that a technical problem resides in enabling the load between the nodes of a distributed database to be regulated in the absence of a central function that monitors the load on the nodes in said database or which handles the total load regulation therein.

A further technical problem is one of providing a load regulating facility that requires no co-ordination between the database nodes, but which can be implemented and handled locally in respective nodes.

A further technical problem is one of providing a load regulating facility that regulates the load between the nodes in the database without needing to re-distribute the information content of said database between the different nodes to this end.

Another technical problem is one of regulating incoming requests to each node in a manner that will ensure that the total number of requests to the database will not exceed its total execution capacity.

Yet another technical problem is one of enabling such limitation to be related to the number of requests that are allowed to enter the database via each individual node.

A further technical problem is one of providing requests with a waiting option when load regulation has shown that a request cannot be permitted because of the danger of overloading the database.

In this respect, a technical problem is one of limiting the request waiting time, and therewith the database response time, when a request cannot be allowed because of the danger of overloading the database.

Another technical problem is one of ensuring that no hot spots will occur in the database, and that this assurance can be upheld in a database that includes nodes of different executing capacities.

When a transaction requested by a user can be divided into a number of operations, and when each commanded operation is comprised of a request, a technical problem resides in ensuring that requests belonging to a transaction that has already commenced can be met so that ongoing transactions can be completed and need not be discontinued or aborted.

Another technical problem is one of enabling a database to be load-regulated with a starting point from the number of incoming requests, where each request comprises a command operation.

A further technical problem is one of enabling the load on a database to be regulated with a starting point from the execution cost incurred by respective requests.

Still another technical problem is one of allotting a relevant execution cost to respective requests.

When no more requests can be permitted through a specific receiving node and when other nodes are able to permit more requests to be undertaken in their capacity as receiving nodes, a technical problem resides in still enabling the specific receiving node to receive more requests.

Another technical problem is one of handling a request that comprises an operation which can be divided into several parts, such as a review of the entire database or a review of parts thereof, when the receiving node and/or one or more other nodes do have the capacity to meet the request.

It is then also a technical problem to handle a request that comprises an operation which can be divided into several parts, such as a review of the entire database or a review of parts thereof, when the receiving node and/or one or more other nodes do not have the capacity to meet the request.
Solution With the intention of solving one or more of the aforesaid technical problems, the present invention takes as its starting point a distributed database where information within the database is distributed between several different nodes belonging to said database, wherein a user request is served either by the node to which the user connects, here referred to as a receiving node, or by some other node after the receiving node has forwarded the request to one of those nodes capable of meeting the request, these nodes being referred to as serving nodes.

With the intention of providing a method of regulating the load in such a database in which no central controlling or monitoring facility is used with respective nodes, it is proposed in accordance with the invention that respective nodes are allocated one or more key-numbers which function to limit the number of requests that respective nodes may accept in their role as a receiving node, and that these key-numbers are related to the executing capacity of the database.

With the intention of limiting the number of requests that can be permitted and therewith ensure that the total execution capacity of the database will not be exceeded, it is proposed in accordance with the invention that respective nodes are allocated a first key-number, and that this first key-number relates to a highest permitted number of requests that can be made to the database via a current receiving node.

It is also proposed in accordance with the invention that used parts of the first key-number are designated used first key-number parts, while unused parts of the first key-number are designated unused first key-number parts.

With the intention of providing a waiting option with respect to requests when the first key-number of the receiving node shows that the request cannot be met, and with the intention of limiting any waiting times and therewith obtain acceptable database response times, it is proposed in accordance with the invention that respective nodes are allocated a first queue belonging to said first key-number, and that said first queue is related to a highest permitted number of requests that can be placed in the queue, or line, so as not to exceed the first key-number.

It is also proposed in accordance with the present invention that used parts of the first queue are designated used first queue places, where empty or unused parts of said first queue are designated unused first queue places.

A user requested transaction can be divided into one or more operations. It is then possible for each commanded operation to constitute a request.

With the intention of giving those transactions that have already been commenced priority over transactions that have not yet been started, it is proposed in accordance with the invention that respective nodes are allocated a second queue, or line, belonging to the first key-number. In the two queues associated with the first key-number, the first queue is related to the highest permitted number of requests belonging to a commenced transaction that can be placed in line in the queue.

Those transactions that have not yet been commenced are placed in the second queue, or line, this queue relating to the highest permitted number of requests belonging to non-commenced transactions that can be placed in line.

Requests in the second queue may not have access to the database until the first queue is empty, in other words all requests in the first queue have access to the database before dealing with requests in the second queue.

The first key-number and its two queues ensure that the total execution capacity of the database will not be exceeded.

With the intention of avoiding hot spots in the database, it is proposed in accordance with the invention that respective nodes are allocated a second key-number, and that this second key-number is related to the highest permitted number of requests that may be forwarded to one and the same serving node in the database. Used parts of the second key-number are designated used second key-number parts, and unused parts of said second key-number are designated unused second key-number parts.

When the database nodes have mutually different execution capacities, it is proposed in accordance with the invention that the nodes can be divided into node groups, each in accordance with the execution capacity of respective nodes, where nodes belonging to a first group have a first execution capacity, where nodes belonging to a second group have a second execution capacity, and so on. When the nodes are so divided, respective nodes are allocated a first second key-number related to the execution capacity of the nodes belonging to the first group, and respective nodes are allocated a second second key-number related to the execution capacity of the nodes belonging to said second group, and so on.

It is also proposed in accordance with the present invention that respective nodes are allocated a third key-number and that the third key-number relates to a highest number of transactions permitted to enter the database via respective receiving nodes. Used parts of the third key-number are designated used third key-number parts, and unused parts of the third key-number are designated unused third key-number parts.

The third key-number functions to ensure that only a given number of transactions can make requests simultaneously to one and the same receiving node. Thus, the first key-number with its first queue, or line, together with the third queue number gives priority to ongoing transactions over new not yet commenced transactions.

The third key-number can be set so that the number of transactions entering the database via one and the same node will be lower than would be possible according to the first key-number and its two queues.

It is also possible to include an hysteresis in the use of the third key-number, i.e. the third key-number can be made to stop the number of transactions at a first value and allows further transactions at a second value where the first value is greater than the second value.

According to the aforegoing, the different key-numbers are related to incoming requests. When a user command transaction can be divided into more than one operations, and when each commanded operation is comprised of a request, it is proposed in accordance with the present invention that respective key-numbers and queues are determined in permitted number of operations, that is with the exception of the third key-number which is determined in the permitted number of transactions. This enables the load on the database to be regulated in accordance with the number of operations commanded by to incoming requests.

According to the present invention, it is also possible to allocate a so-called execution cost to respective operations, and to determine respective key-numbers and queues, with the exception of the third key-number, in the permitted execution cost. This enables the load on the database to be regulated, or controlled, in accordance with the execution cost incurred by the operations in conjunction with incoming requests.

Such execution costs can be determined in several ways. According to one inventive method, the execution cost is determined with respect to the number of bytes included in the command string associated with the operation.

According to another inventive method, the execution cost of an operation is determined by dividing the operations into different types of operation, such as the insertion of data, reading of data, updating data or deleting data, and the execution cost is determined with respect to the type of operation concerned and with respect to the amount of data, or information, concerned in the operation.

With the intention of allowing the receiving node to receive more requests despite the fact that said node is unable to receive more requests without exceeding the first key-number and its associated queues, it is proposed in accordance with the present invention that the receiving node is allowed to borrow unused first key-number parts, unused first queue places and/or unused second queue places from some other node that has unused first key-number parts and/or unused queue places, therewith allowing an extra number of requests to be made to the database in addition to the first key-number and its queue places for the receiving node, this additional number of requests corresponding to the number of unused first key-number parts, empty queue places and/or second queue places belonging to the second node. A number of the unused first key-number parts, the first queue places and/or the second queue places belonging to the second node corresponding to said additional number of permitted requests are then considered to be used queue places.

A request may also constitute a so-called large operation that can be divided into several parts, such as a review of the entire database or of parts thereof. In the case of a request of this nature, it is proposed in accordance with the present invention that the operation is carried out as a single operation when the number of unused first key-number parts, the number of first queue places and/or the number of second queue places of the receiving node and/or one or more other nodes is sufficient to this end.

If, on the other hand, the number of unused first key-number parts, the number of first queue places and/or the number of second queue places of the receiving node and other nodes is insufficient to carry out the operation, it is proposed in accordance with the present invention that the operation is allocated one or more first key-number parts and second key-number parts and also a third key-number part. While the operation uses the third key-number part, a first part of the operation is carried out by using the first and the second key-number parts, whereafter a second part of the operation is also performed by using the first and the second key-number parts, and so on, until all parts of the operation have been carried out, whereafter the first, second and third key-number parts are again available for other operations.

In conjunction with operations of this kind that can be divided into several smaller parts, it is proposed in accordance with the invention that respective nodes are allocated a fourth key-number, and that the fourth key-number is related to a highest permitted number of parts of relevant key-numbers that can be allocated to so-called large operations.

This prevents large operations from seizing the entire capacity of a receiving node, or nodes, because part of the key-numbers concerned remain to serve requests other than those associated with the large operation or operations.

According to the present invention, the fourth key-number shall be smaller than or equal to the first key-number.

Advantages

The advantages primarily characteristic of an inventive method reside in the ability to regulate, or control, the load on the nodes in a database without needing to use a central monitoring and regulating function to this end. The load is controlled by using in each individual node key-numbers that may not be exceeded. The inventive method thus requires no active control or no redistribution of the data content of the database between the nodes therein.

The method also enables hot spots to be avoided in the database. Another advantage is that when a receiving node is unable to receive more requests because it has no unused parts and/or no empty queue places in the own node, parts and/or queue places can be "borrowed" from nodes that are not equally as loaded at that point in time.

The main characteristic features of an inventive method are set forth in the characterising clause of the following claim 1.

BRIEF DESCRIPTION OF THE DRAWINGS

A method that has characteristic features according to the present invention will now be described by way of example with reference to the accompanying drawings, in which

FIG. 2 illustrates schematically the function of a first key-number in accordance with the invention;

FIG. 3 is a schematic illustration of a first queue, or line, and its relation to the first key-number;

FIG. 4 is a schematic illustration of a first and a second queue, or line, related to the first key-number, and a third key-number and its relationship to the first key-number with associated queues;

FIG. 5 illustrates schematically and in table form a second key-number and its relationship to different nodes;

FIG. 6 illustrates schematically the second key-number related to groups of nodes that have mutually different execution capacities;

FIG. 7 illustrates schematically a first method of calculating the cost of executing an operation;

FIG. 8 illustrates schematically a second method of calculating the cost of executing an operation;

FIG. 10 shows schematically that a large operation can be divided into several smaller parts;

FIG. 11 illustrates schematically the allocation of parts of the first, second and third key-numbers to a large operation; and FIG. 12 illustrates schematically a fourth key-number.

DESCRIPTION OF EMBODIMENTS AT PRESENT PREFERRED

Figure 1:
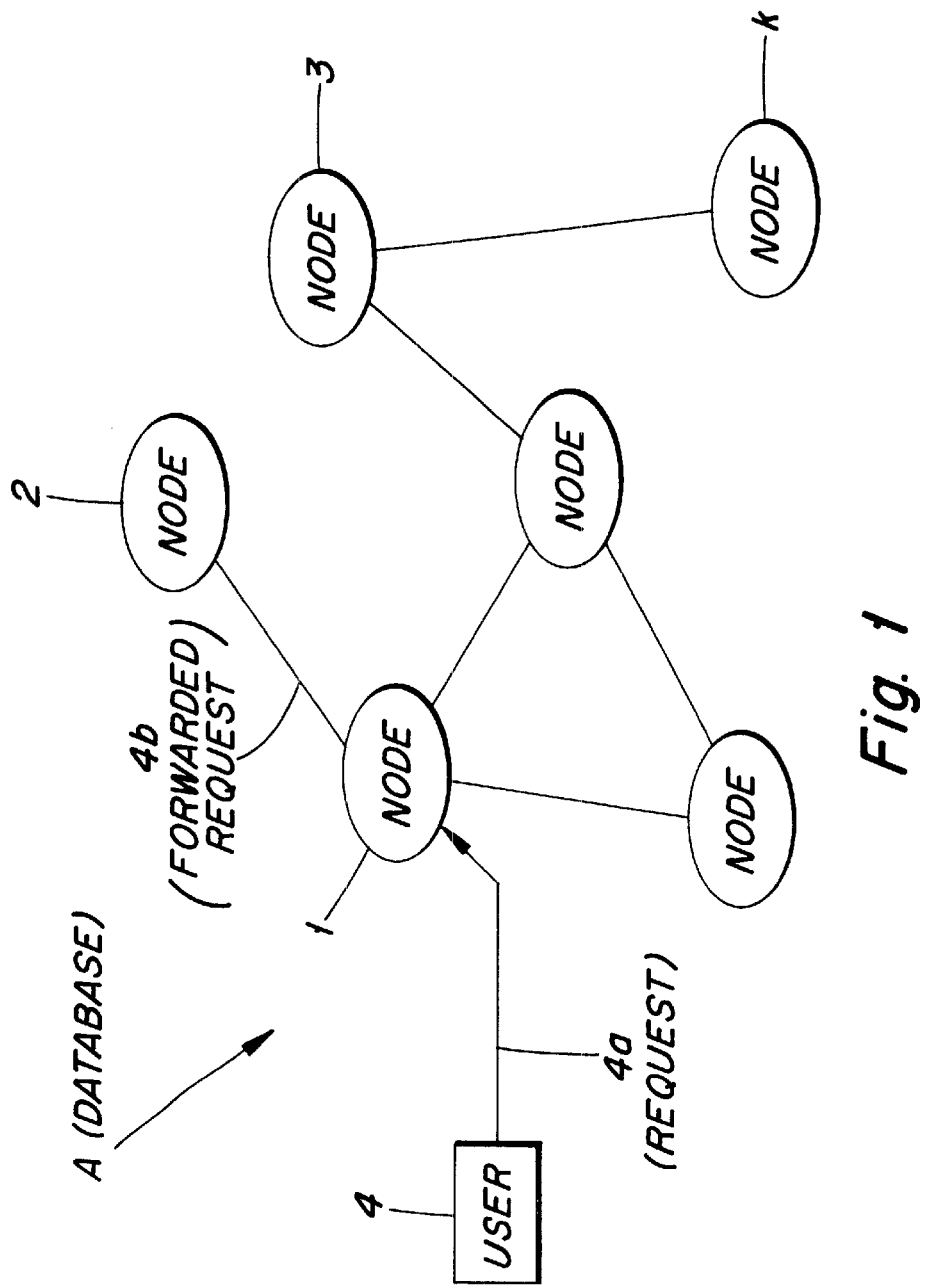
FIG. 1 is a schematic, highly simplified illustration of a database and its associated nodes.

FIG. 1 illustrates a method of regulating or controlling the load in a distributed database A. The data or information entering the database A is distributed between a plurality of different nodes 1, 2, 3, . . . , k belonging to the database.

A request 4a asked of a user 4 is served either by the node to which the user 4 connects, here designated the receiving node 1, or by some other node subsequent to the receiving node having forwarded 4b the request to a node that can meet the request, this other node being designated the serving node 2. For instance, if the user 4 requests access to data information that is not stored on the receiving node 1, the request is forwarded from the receiving node 1 to the node on which the desired data information is stored. This node will then be the serving node 2.

According to the present invention, respective nodes are allocated with one or more so-called key-numbers.

A key-number limits the number of requests that a respective node is capable of accepting in its role as a receiving node, these key-numbers being related to the execution capacity of the database.

Such key-numbers can be created and configured in many different ways. The following description includes examples of four different key-numbers, their significance, and how they function to regulate the load on the different nodes 1, 2, 3, . . . , k belonging to the database A.

According to the inventive method, respective nodes shall be allocated a first key-number n1 which is related to a highest permitted number of requests that are allowed to enter the database A via the receiving node 1.

Used parts of the first key-number n1 are designated used first key-number parts n1a and unused parts of the first key-number n1 are designated unused first key-number parts n1f, according to FIG. 2.

If a request means that the first key-number n1 will be exceeded, the request is placed in a queue, or line.

Respective nodes are also allocated a first queue n11 which is related to a highest number of requests that may be allowed to be placed in line in order for the first key-number n1 not to be exceeded.

FIG. 3 shows an example where only used first key-number parts n1a are present and where further requests have been placed in line in the first queue n11.

Used parts of the first queue n11 are designated used first queue places n11a, and unused parts of the first queue n11 are designated empty first queue places n11f.

A transaction requested by a user can be divided into one or more operations, and each commanded operation may constitute a request. For instance, a transaction may simply comprise reading data information stored in a node and writing the read data information into another node, where reading and writing can be seen as two different operations. Such a transaction will thus comprise two different operations.

When a transaction may include several different requests, initial operations can be carried out while one or more terminating requests cannot be performed because to do so would exceed the first key-number n1 and the first queue n11 of the receiving node.

The present invention enables the option of giving priority to work that has already been performed, so that performed requests need not be lost because the transaction has to be discontinued or aborted.

To this end, it is proposed in accordance with the invention that respective nodes are allocated a second queue n12 belonging to the first key-number n1, as shown in FIG. 4.

The first queue n11 of these two queues n11, n12 relates to a highest permitted number of requests belonging to an ongoing transaction that can be placed in line.

Requests belonging to transactions that have not been commenced are placed in the second queue n12, unless they can be met in accordance with the first key-number n1.

Only requests that belong to ongoing transactions may be stored in the first queue n11, these transactions being given priority over requests in the second queue n12.

A request waiting in the second queue n12 can only be afforded access to the database through the first key-number when no requests are found stored in the first queue n11, in other words no new non-commenced transactions can be given access to the database whilst requests concerning transactions that have already been commenced await access to the database.

The number of requests belonging to non-commenced transactions that may await access to the database, is limited according to the second queue n12, meaning that a request belonging to a transaction that has not been commenced can be refused access via the node concerned. This limits user response times in the database and also enables the user to seek access via some other node in the database instead.

When a request belonging to a transaction that has not been commenced is given access to the database, all requests associated with this transaction are placed in the first queue n11. If these requests have earlier waited in the second queue n12, the second queue will thus be drastically reduced, by giving access to the database to only one request from this queue.

The first key-number n1 and its associating queues n11, n12 ensure that only a largest permitted number of requests can enter the database A and also prevents the total executing capacity of the database from being exceeded.

Respective nodes are also allocated a second key-number n2 which is related to a highest permitted number of requests that may be forwarded to one and the same serving node in the database.

FIG. 5 shows a list of a number k of second key-numbers n2, where k is the number of nodes in the database. Each position in the list shows the extent to which the second key-number has been used for respective nodes in the database.

Used parts of the second key-number n21, n22, n23, . . . , n2k are designated used second key-number parts n21a, n22a, n23a, . . . , n2ka, while unused parts of the second key-number n21, n22, n23, . . . , n2k are designated unused second key-number parts n21f, n22f, n23f, . . . , n2kf.

The second key-number n2 ensures that no hot spots will occur in the database.

The second key-number is related to the executing capacity of respective nodes. The database may include nodes that have mutually different execution capacities. In order to handle this possibility effectively, it is proposed in accordance with the invention that the nodes are divided into groups in accordance with their respective execution capacities.

FIG. 6 is intended to show that in such grouping, nodes belonging to a first group will have a first execution capacity, nodes belonging to a second group will have a second execution capacity, and so on. According to this particular embodiment, respective nodes are allocated a first second key-number 1n2 related to the execution capacity of the nodes belonging to the first group, a second second key-number 2n2 related to the execution capacity of the nodes belonging to the second group, and so on. This enables the load on the nodes to be adapted to their individual execution capacities.

In FIG. 6, respective positions in the list 1n2 that represents the first group are related to a node within this group, while respective positions in the list 2n2 that represents the second group are related to a node within this group, and so on.

Referring back to FIG. 4, it will be seen that respective nodes are allocated a third key-number n3 that is related to a highest permitted number of transactions that may enter the database via the receiving node, in accordance with the invention.

Used parts of this third key-number n3 are designated used third key-number parts n3a, while unused parts of said third key-number n3 are designated unused third key-number parts n3f.

The third key-number functions to allow only a certain number of transactions to enter requests to one and the same receiving node simultaneously. This means that the first queue n1 belonging to the first key-number n1, and the third key-number n3 will give priority to requests belonging to ongoing transactions over requests that belong to transactions that have not yet been commenced.

The third key-number n3 can be set so that the number of transactions that enter the database via one and the same node will be lower than the number of transactions possible according to the first key-number n1 and its two queues n11, n12.

The use of the third key-number n3 may include an hysteresis, i.e. the third key-number may be caused to stop the number of transactions at a first value n31 and to permit further transactions at a second value n32, where the first value is greater than the second value.

The described key-numbers n1, n2 and associated queues n11, n12 may be allocated different magnitudes which depend on the precision in which the load on the database shall be regulated; this does not include the third key-number n3, which is determined in the permitted number of transactions.

One way of determining the magnitudes of the key-numbers and queues is to use the permitted number of operations to this end.

Another way is to allocate to respective operations a so-called execution cost and to determine described key-numbers and queues in the permitted execution cost. The execution cost is then a measurement of how much capacity is required to execute the operation.

According to one preferred embodiment, the execution cost is determined with respect to the number of bytes included in the actual command string associated with a current operation.

FIG. 7 shows schematically the appearance of a transaction tr. This transaction includes a header "h", a first operation op1 having a value v1, a second operation op2 having a value v2, and so on.

According to this embodiment, the execution cost "e" of the first operation op1 would correspond to the number of bytes included by the operation op1 and its value v1.

FIG. 8 illustrates another proposed embodiment in which different operations are divided into different types of operations, such as insertion of information or data "i", reading information or data "r", updating information or data "u", or deleting information or data "d". In this division, the execution cost "v", "w", "x", "y" can be determined with respect to the type of operation "i", "r", "u", "d" intended, and with respect to the amount of information affected by the operation.

In the earlier described method, regulation of the load in respective nodes is effected totally regardless of other nodes. This may mean that requests are denied access to the database, because the first key-number n1 and its two queues n11, n12, or the third key-number may not be exceeded by the receiving node 1. It may also happen that corresponding key-numbers or queues of some other node 2, 3, . . . , k would not be exceeded by the same request.

Figure 9:
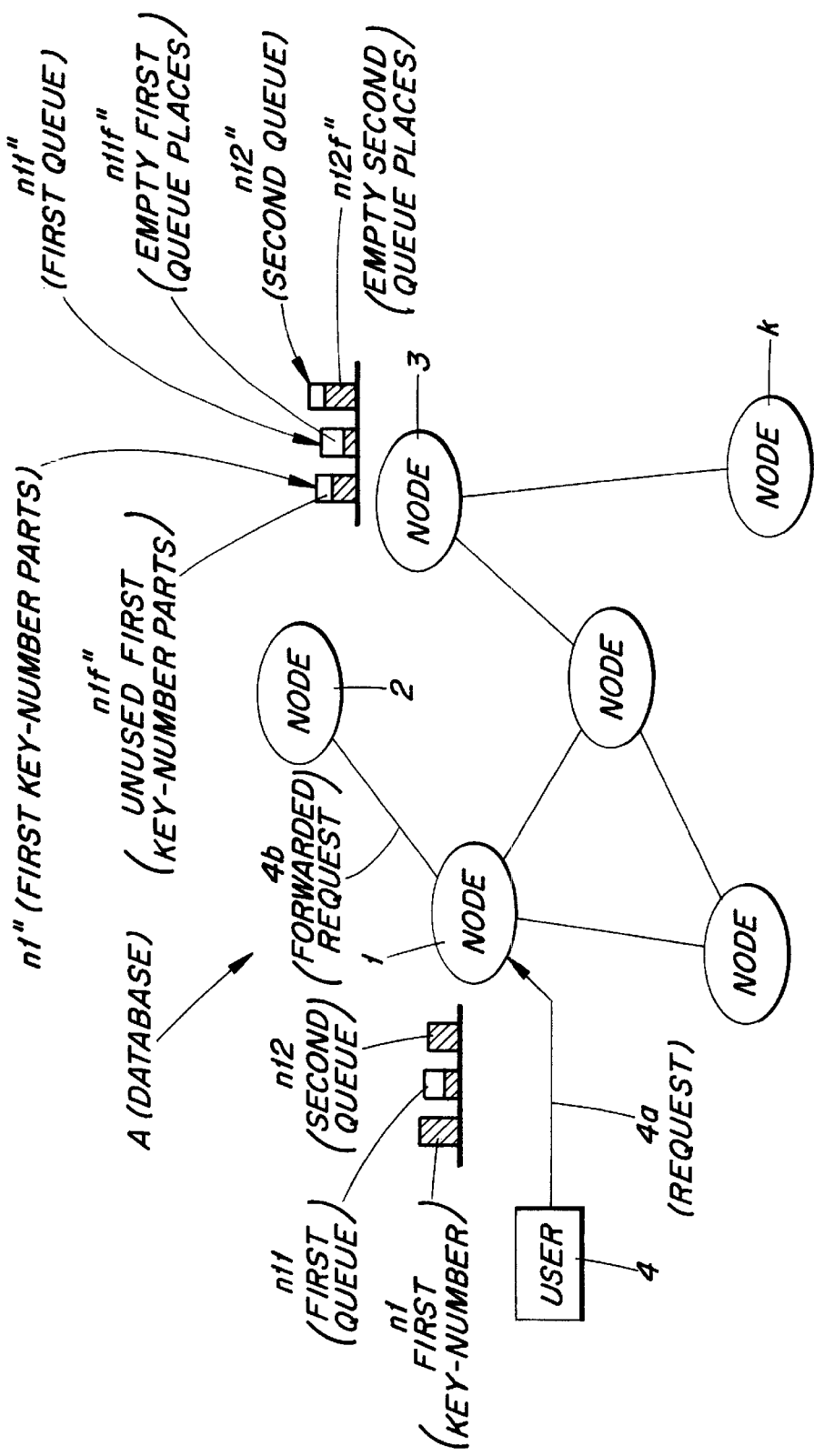
FIG. 9 illustrates schematically the ability of a receiving node to borrow parts and queue places from other nodes.

Shown in FIG. 9 is a proposed embodiment of the present invention in which a receiving node 1 borrows unused first key-number parts n1", first queue places n11f', and/or second queue places n12f' from some other node 3 that has unused first key-number parts, empty first queue places and/or second queue places, when the receiving node 1 is unable to accept more requests without exceeding the first key-number n1 or its queues n11, n12.

This is achieved by the receiving node 1 permitting an additional number of requests to be made to the database in addition to the first key-number n1 and its queues n11, n12 for the receiving node, this additional number corresponding to the number of unused first key-number parts n1f', empty first queue places n1f' and/or empty second queue places n12f' belonging to the second node 3. A number of these unused first key-number parts and/or empty queue places belonging to the second node will then be considered to be used, in accordance with the extra number of requests permitted.

This possibility of borrowing key-number parts and queue places from other nodes can be readily implemented by communication between affected nodes in the absence of any central monitoring facility. However, there is nothing to prevent available key-number parts and queue places being distributed by a central control facility in the database.

There is one type of request that has not yet been discussed, namely requests that comprise a so-called large operation. By large operation is meant an operation that can be divided into several parts, such as a review of the entire database or of parts thereof, for instance.

Scanning of a table in the database is an example of such a review. A scan can thus be seen as a logic operation which can be divided into several physical operations, which, in turn, can be divided into groups of operations that can be allowed access to the database in parallel with one another, where each group constitutes a part of the large operation.

FIG. 10 is a schematic illustration of a table t1 in the database A, where different table parts t11, t12, t13 are stored in different nodes 1, 2, 3 belonging to the database.

An operation op1 comprising a review of the table t1 is shown in the Figure. The operation includes a first part op11 which is a review of a table part t11 stored in the receiving node 1, a second part op12 which is a review of a table part t12 stored in a serving node 2, and a third part op13, which is a review of a table part t13 stored in a serving node 3.

When such a request is received, the operation op1 is carried out in accordance with the invention as a single operation when the number of unused first key-number parts n1f, the first queue places n11f and/or second queue places n12f of the receiving node 1 and/or one or more other nodes 2, 3, . . . , k is sufficient to perform the operation.

When the number of unused first key-number parts n1f, the number of first queue places n11f and/or second queue places n12f of the receiving node 1 and possibly other nodes 2, 3, . . . , k is insufficient to perform the operation op1 as a single operation, the operation op1 is allocated one or more first and second key-number parts and a third key-number part in at least the receiving node.

FIG. 11 is a schematic illustration of the key-numbers n1, n2 and n3 of the receiving node 1. The Figure shows that a first portion n1x of an unused first key-number part n1f is allocated to the operation op1 and used by the different parts op11, op12, op13 of the operation op1.

The Figure also shows that three portions n2x, n2y, n2z of unused second key-number parts n2f are allocated to the operation op1, i.e a first portion n2x for reviewing the table part t1 stored in the receiving node 1, a second portion n2y for reviewing the table part t2 stored in the serving node 2, and a third portion n2z for reviewing that part of the table t1 stored in the serving node 3.

The Figure also shows that a first portion n3x of an unused third key-number part n3f is allocated to the transaction of which the operation op1 forms a part, this first portion n3x being used during the entire review of the table t1.

As the transaction and the operation op1 use the first portion n3x belonging to the unused third part n3f of the third key-number n3, a first part of the operation op11 is performed while using the first portion n1x of the first unused part n1f and the first portion n2x of the second unused part n2f.

The second part of the operation op12 is performed while using the first portion n1x of the first unused key-number part n1f and the second portion n2y of the second unused key-number part n2f intended to this end, and so on until all parts of the operation have been carried out. The used portions n1x, n2x, n2y, n2z of the unused first and second key-number parts n1f, n2f are then again available for other operations.

The first portion n3x of the unused third part n3f of the third key-number may possibly still be occupied by transactions comprising further operations that have still not been carried out.

A scan may also include a review of several tables, or solely a review of one or more specific indexes belonging to one or more tables. The person skilled in this art will realise that the present invention can also be implemented in these instances.

According to the present invention, respective nodes may also be allocated a fourth key-number n4 as shown in FIG. 12, this fourth key-number being related to a highest permitted part of relevant key-number parts n1f, n2f, n3f that can be allocated to a large operation.

This fourth key-number n4 is smaller than or equal to the first key-number n1. The size of the parts of said different key-numbers that can be allocated to large operations determines how much space will be available for other requests during the review of the large operation. When large operations can be allowed to seize all of the availability in the database, the fourth key-number can be made equal to the first key-number.

It will be understood that all of the aforedescribed key-numbers can be adapted to take into account requests that may arrive from transactions that have mutually different allotted priorities, and consequently the requests shall also be treated with different priorities.

Priority handling of the requests can be implemented in different ways, for instance by allocating to the key-numbers different queues for different priorities. This has been described above with respect to giving requests belonging to commenced transactions priority over requests that belong to transactions which have not yet been started, by virtue of the two queues n11, n12 belonging to the first key-number n1.

It will be understood that the invention is not restricted to the aforedescribed exemplifying embodiment thereof and that modifications can be made within the scope of the inventive concept illustrated in the following claims.

What is claimed is:

1. A method of regulating the load in a distributed database where information within the database is distributed between several different database nodes and where a user request is served either by the node to which the user connects, here designated the receiving node, or by another of said nodes that is capable of meeting the request, here designated the serving node, after the receiving node having forwarded said request to said other node, comprising the steps of allocating to respective nodes one or more so-called key-numbers which function to limit the number of requests that respective nodes may accept in their role as a receiving node; and by relating sad key-numbers to the executing capacity of said database.

2. A method according to claim 1, comprising the steps of allocating a first key-number to respective nodes and relating said first key-number to a highest permitted number of requests that may enter the database via said receiving node, wherein used parts of said first key-number are designated used first key-number parts, and wherein unused parts of said first key-number are designated unused first key-number parts.

3. A method according to claim 2, comprising the steps of allocating to respective nodes a first queue related to said first key-number, and relating said first queue to a highest permitted number of requests that can be placed in line in order not to exceed said first key-number, where used parts of said first queue are designated used first queue places, and where unused parts of said first queue are designated unused first queue places.

4. A method according to claim 3, in which a user commanded transaction can be divided into one or more requests, comprising the steps of allocating to respective nodes a second queue related to said first key-number, and relating said first queue to a highest permitted number of requests belonging to a transaction that has already commenced and that can be placed in line without exceeding said first key-number, and by relating said queue to a highest permitted number of requests belonging to a transaction that has not yet been commenced and that can be placed in line without exceeding said first key-number.

5. A method according to claim 1, further comprising the step of: allocating to respective nodes a second key-number and relating said second key-number to a highest permitted number of requests that may be forwarded to one and the same serving node within said database, where used parts of said second key-number are designated used second key-number parts, and where unused parts of said second key-number are designated unused second key-number parts.

6. A method according to claim 5, comprising the steps of dividing said nodes into groups of nodes in accordance with the execution capacity of respective nodes, where nodes belonging to a first group have a first executing capacity, where nodes belonging to a second group have a second executing capacity, and so on; allocating to respective nodes a first second key-number related to the executing capacity of the nodes belonging to said first group; and allocating to respective nodes a second second key-number related to the executing capacity of the nodes belonging to said second group, and so on.

7. A method according to claim 1, in which a user requested transaction can be divided into one or more operations, and in which each commanded operation is comprised of a request, further comprising the step of: determining said key-number and queues in the permitted number of operations.

8. A method according to claim 1, in which a user requested transaction can be divided into one or more operations, and in which each commanded operation is comprised of a request, further comprising the steps of: allocating to respective operations a so-called execution cost; and determining said key-number and queues in the permitted execution cost.

9. A method according to claim 8, comprising the step of determining said execution cost with respect to the number of bytes included by the actual command string belonging to said operation.

10. A method according to claim 8, comprising the step of dividing said operations into different types of operations, such as the insertion of information, reading of information, updating information or deleting information; and determining said execution costs with respect to the type of operation concerned and with respect to the amount of information involved.

11. A method according to claim 1, where a user requested transaction can be divided into more than one operations and where each commanded operation is comprised of a request, further comprising the step of: allotting to respective nodes a third key-number, and relating said third key-number to a highest permitted number of transactions that may enter the database via said receiving node, wherein used parts of said third key-number are designated used third key-number parts, and where unused parts of said third key-number are designated unused third key-number parts.

12. A method according to claim 4, comprising the step of borrowing unused first key-number parts, unused first queue places and/or unused second queue places from some other node that has unused first key-number parts, unused first queue places and/or unused second queue places when said receiving node is unable to receive more requests without exceeding said first key-number with associated first and second queues, by permitting an additional number of requests to said database in addition to said first key-number with associated first and second queues for said receiving node, said additional number corresponding to the number of unused first key-number parts, unused first queue places and/or or unused second queue places belonging to said second node, wherein a number of said unused first key-number parts, unused first queue places and/or unused second queue places belonging to said second node are considered to be used key-number parts and queue places respectively according to said additional number of requests.

13. A method according to claim 1, where said request is a so-called large operation that can be divided into several parts, such as a review of the entire database or parts thereof, further comprising the step of: performing said operation as a single operation when the number of unused first key-number parts, unused first queue places and/or unused second queue places of the receiving node and/or of one or more other nodes is sufficient to perform said operation.

14. A method according to claim 4, where said request is a so-called large operation that can be divided into several parts, such as a review of the entire database or of parts thereof, further comprising the steps of: allocating to said operation one or more portions of unused first and second key-number parts and a portion of an unused third key-number part when the number of unused first key-number parts, the number of unused first queue places and/or the number of unused second queue places of said receiving node and said other nodes is insufficient to perform said operation; performing a first part of said operation with the use of said portions of unused first and second key-number parts whilst said operation uses said portion of an unused third key-number part, whereafter a second part of said operation is performed and also uses said portions of said unused first and second key-number parts, and so on until all parts of the operation have been carried out, whereafter said portions of said unused first, second and third key-number parts are again available for other operations.

15. A method according to claim 14, comprising the step of allocating to respective nodes a fourth key-number, and relating said fourth key-number to a highest permitted part of relevant unused key-number parts that can be allocated to one or more large operations.

16. A method according to claim 15, wherein said fourth key-number is smaller than or equal to said first key-number.

* * * * *